United States Patent [19]

Maeda et al.

[11] Patent Number: 4,886,246

[45] Date of Patent: Dec. 12, 1989

[54] METAL-MAKING APPARATUS INVOLVING THE SMELTING REDUCTION OF METALLIC OXIDES

[75] Inventors: Takuya Maeda; Keikichi Murakami; Tsutomu Yamada, all of Kobe; Mitsuharu Kishimoto, Harima; Kenichi Yajima; Yoshihiko Takemura, both of Kobe, all of Japan

[73] Assignee: Kawasaki Jukogyo Kabushiki Kaisha, Hyogo, Japan

[21] Appl. No.: 272,053

[22] Filed: Nov. 14, 1988

[30] Foreign Application Priority Data

Nov. 13, 1987 [JP] Japan .................................. 62-288150
Nov. 13, 1987 [JP] Japan .................................. 62-288151

[51] Int. Cl.$^4$ .............................................. F27B 15/00
[52] U.S. Cl. .................................... 266/157; 266/160; 266/172; 75/26; 75/38
[58] Field of Search ...................... 266/157, 160, 172; 75/26, 38

[56] References Cited

FOREIGN PATENT DOCUMENTS 104410 6/1984 Japan .................................. 266/172
2228878 10/1987 Japan .................................. 266/172

Primary Examiner—Melvyn J. Andrews
Attorney, Agent, or Firm—Wenderoth, Lind & Ponack

[57] ABSTRACT

A metal-making apparatus is suited for the production of molten iron from iron ore which is in a state of particles with a wide range in size. Included are a solid-state prereduction furnace for preliminarily reducing the raw ore particles in a solid state, and a smelting reduction furnace for smelting the prereduced ore particles and reducing them in a molten state. High temperature reducing gas generated within the smelting reduction furnace is directed into the prereduction furnace and blown up through a distributor on which there is loaded a charge of raw ore particles. The ore particles of larger size form a fluidized bed on the distributor and so are prereduced by making intimate contact with the gas. Ore particles of smaller size, on the other hand, are carried away from the fluidized bed by the waste gas and thereby prereduced while being recirculated through the prereduction furnace. Discharged from the prereduction furnace, the prereduced ore particles of larger size are recharged by the force of gravity into the smelting reduction furnace. The prereduced ore particles of smaller size are recovered from the waste gas and pneumatically injected into the smelting reduction furnace.

8 Claims, 3 Drawing Sheets

METAL-MAKING APPARATUS INVOLVING THE SMELTING REDUCTION OF METALLIC OXIDES

BACKGROUND OF THE INVENTION

This invention relates to an apparatus for the production of molten metals from their ores, and more specifically to a metal-making apparatus of this general nature based upon the technology of smelting reduction of ores containing oxides of the desired metals. Still more specifically, the invention pertains to such a metal-making apparatus making possible the use of ores in a wide range of particle size.

The smelting reduction method is one whereby metals such as iron and ferroalloys are produced by reductive treatment of iron oxide ores or the like in a molten state. The metal-making industry has devoted research and development efforts to the enhancement of the practical utility of this method because of its potential capability of meeting the foreseeable future trend of materials and energy supply.

Among the advantages of the smelting reduction method are, as far as iron making is concerned: (1) cheapness of the raw materials as compared with those required for the blast furnace method; (2) elimination of pretreatments such as sintering or pelletizing of too fine ore particles; and (3) compactness of the equipment required. Additionally, for the production of ferroalloys, the metal promises greater independence from electric energy than most other known methods.

While a variety of suggestions and proposals have so far been made for the practice of the smelting reduction method, the current trend in the industry is toward the use of two furnaces in tandem, one for preliminary reduction of the ore in a solid state and the other for smelting reduction. There are many variations in this tandem-furnace method, involving different furnace types and different heat production methods.

Generally, such known tandem-furnace methods are preferred by reason of the regenerative process involved; that is, the prereduction of the solid-state ore is possible by making use of the heat and reductive capability possessed by the waste gas generated from the smelting reduction furnace. The reductive gas is generated at high temperatures as a result of the reduction taking place within the smelting reduction furance as coil or like material and oxygen gas are introduced into the metal bath therein. Upon withdrawal from the smelting reduction furnace, the reductive high-temperature gas is directed into the prereduction furnace for the preliminary reduction of the ore in the solid state.

The general belief of specialists is that the prereduction furnace should advantageously be of the so-called "fluidized bed" or fluosolids type, provided that the ore is more or less in a state of fine particles. This type of furnace gives the properties of a quasifluid to the ore particles introduced therein, making possible, the continuous processing of the pulverized material. As additional advantages, the complete charge of ore particles within the furnace can be maintained at a constant temperature, and the ore particles make intimate contact with the reducing gas.

A typical prior art prereduction furnace of the fluidized bed type is found in Japanese Laid Open Patent Application No. 58-217615. It comprises a vessel in the form of an upstanding cylinder, with an ore supply chute and a gas exhaust conduit coupled to its top portion, and with a reducing gas supply conduit and an ore discharge chute coupled to its bottom portion. The furnace vessel has a gas distributor in the form of a grate or perforated bottom laid horizontally above the intake port of the reducing gas.

Ore in the state of fine particles is charged onto the gas distributor of the furnace, whereas the high temperature reducing gas is introduced into the furnace through an inlet port positioned under the gas distributor. Stirred by the reducing gas blasted up through the gas distributor, the ore particles will become "fluid" enough to make intimate contact with the gas thereby undergoing the desired process of prereduction. The material in this condition forms a "fluidized bed", with the reducing gas "bubbling up" therethrough. After having been thus prereduced, the ore particles will be discharged from the prereduction furnace and recharged into the smelting reduction furnace for final reduction in the molten state.

As so far constructed, however, the fluidized-bed type prereduction furnace has had a weakness. It imposes strict limitations upon the particle size of the ore in order to form a sufficiently "fluid" mass of the ore particles within the furnace. The reducing gas must be introduced at a rate depending upon the particle size of the ore in order to impart sufficient "fluidity" to the ore particles. Therefore, the prior art prereduction furnace does not lend itself to the processing of ore particles which differ in size over a wide range. The particle size has had to be not more than three millimeters for successful prereduction. Moreover, depending upon the particular prereduction process employed and the particular kind of ore to be processed, additional limitations have been imposed on the average particle size and on the percentage of very fine particles present.

The inconveniences arising from such limitations of the prior art fluidized-bed type prereduction furnace will become apparent in the light of the fact that the iron ores available commercially as the raw materials of iron manufacture contain a considerable percentage (e.g. 30 percent) of particles exceeding three millimeters in size. Even particles of 10 millimeters or more in size are present.

A conventional solution to this problem has been the sizing of ore particles by screening. Particles too coarse to be treated by the prereduction furnace of the fluidized-bed type have had to be recomminuted into the required size. Alternatively, if such coarse particles are not to be recomminuted, some other reduction means such as a shaft furnace have had to be employed. In any event, for making full use of the materials purchased, the prior art fluidized bed furnace has required some additional means such as screens and crushers, or another reducing furnace, thus incurring additional installation and running costs, and additional manufacturing steps.

There have also been some problems left unsolved in conjunction with the smelting reduction furnace to be connected in tandem with the solid-state prereduction furnace. The following two methods of charging ore into the furnace have been suggested:

1. The gravity charging of the whole ore particles from the top portion of the furnace.

2. The carrier-gas charging of the whole ore particles through a nozzle coupled to either the midportion or bottom portion of the furnace (Japanese Laid-Open Patent Application No. 59-113110).

The first described method of gravity charging is objectionable because the finer ones of the ore particles, on being introduced into the smelting reduction furnace, tend to be blown out of the furnace by the gas generated therein. It may be contemplated to avoid such waste of the material by previously screening out the finer particles or by pelletizing the fine particles into larger ones by use of a binder. But then these measures demand the provision of screens or like sizing means, or means for pelletizing, as well as additional processing steps and additional processing time.

The second recited method of carrier-gas charging, although free of the noted drawbacks of the gravity charging method, has its own shortcomings. If the pulverized material contains too coarse particles or lumps, they may clog up the charging nozzle or the conduit leading to the nozzles. It would be no satisfactory solution to make the nozzle and conduit large enough to permit the passage of such coarse lumps. For such large nozzle and conduit would require a corresponding increase in the flow rate of the carrier gas, possibly resulting in a bad effect to the reduction reaction and an undue drop in the bath temperature or in the blowing of the carrier gas through the metal bath. The usual practice, therefore, has been to pulverize the ore into sufficiently fine particles to preclude the possibility of clogging. This practice is also objectionable because of such additional means required as crushers and screens, and of the additional operation necessitated.

SUMMARY OF THE INVENTION

The present invention solves all the above discussed problems of the prior art and provides an improved metal-making apparatus of the type comprising a tandem arrangement of a solid-state prereduction furnace and a smelting reduction furnace for the production of iron or other metal by the reduction of the oxide of the metal. Particularly, the invention seeks to make possible the use, as raw materials, of pulverized ores of widely varying particle sizes without the need for screening, recomminuting, or pelletizing them. Further the invention seeks to accomplish a thoroughly streamlined processing of such raw materials from their solid-state prereduction to their smelting reduction.

Briefly, the invention may be summarized as a metal-making apparatus using raw ore which contains a metallic oxide and which is in the state of particles with a wide range in size. The metal-making apparatus comprises a solid-state prereduction furnace for preliminarily reducing the raw ore in a solid state. The prereduction furnace has a gas distributor on which is deposited a charge of the raw ore particles in a wide range in size. High temperature reducing gas is blown up through the gas distributor and the charge of raw ore particles thereon. Consequently, the ore particles of larger size form a fluidized bed on the gas distributor and are prereduced by making intimate contact with the high temperature reducing gas, whereas the ore particles of smaller size are carried away from the fluidized bed by the waste gas and thereby prereduced. Discharged from the prereduction furnace, the prereduced ore particles of larger size are recharged by the force of gravity into a smelting reduction furnace. The prereduced ore particles of smaller size, on the other hand, are recovered from the waste gas of the prereduction furnace and recharged into the smelting reduction furnace by pneumatic injection. The prereduced ore particles of both sizes are smelted in the smelting reduction furnace and finally reduced in the molten state to provide the desired metal.

In addition, the raw ore particles charged into the prereduction furnace may include those too coarse to form a fluidized bed together with other medium-size particles. Such oversize ore particles will form, instead, what may be called a "mobile layer" over the gas distributor and under the fluidized bed of the medium-size particles. Preferably, the gas distributor has a funnel-shaped or otherwise inclined top surface, so that the oversize ore particles will be prereduced while slowly traveling over the inclined surface of the grate toward a discharge opening formed therein. The prereduced oversize particles will be discharged from the prereduction furnace together with the medium-size particles, for joint gravity charging into the smelting reduction furnace.

The raw ore particles too fine to form a fluidized bed, on the other hand, will be carried away from above the fluidized bed by the upflow of the high temperature reducing gas. Carried by the waste gas, such undersize particles will flow into a cyclone separator or like gas-solid separator, which is disposed outside the prereduction furnace, thereby to be recovered from the waste gas. The recovered undersize ore particles may be recharged into the prereduction furnace. While being so recirculated, the undersize ore particles will also be prereduced, so that part of the recirculating particles may be withdrawn from the recirculation path for pneumatic injection into the smelting reduction furnace.

Thus, although the solid-state prereduction furnace is basically of the fluidized-bed type, the raw ore particles charged therein may contain those both too large and too small to form a fluidized bed. All such particles of a wide range of size can be prereduced in the solid state without the inconveniences encountered heretofore.

According to a further feature of the invention, the oversize and medium-size particles and the undersize particles are separately discharged from the prereduction furnace and separately charged into the smelting reduction furnace. The oversize and medium-size particles are charged by gravity into the smelting reduction furnace, there being little hazard of such particles being blasted away by the gas generated within and rising from the smelting reduction furnace. The undersize particles are pneumatically charged into the smelting reduction furnace, as by an injection nozzle submerged in the metal or slag bath within the furnace or by an injection lance above the level of the bath. Advantageously, such undersize particles can be smoothly conveyed through a conduit system of relatively small diameter and by a carrier gas supplied at a relatively low rate.

The above and other features and advantages of this invention and the manner of realizing them will become more apparent, and the invention itself will best be understood, from a study of the following description and appended claims, with reference to the attached drawings showing some preferred embodiments of the invention.

DESCRIPTION OF THE PREFERRED EMBODIMENTS

Figure 1:
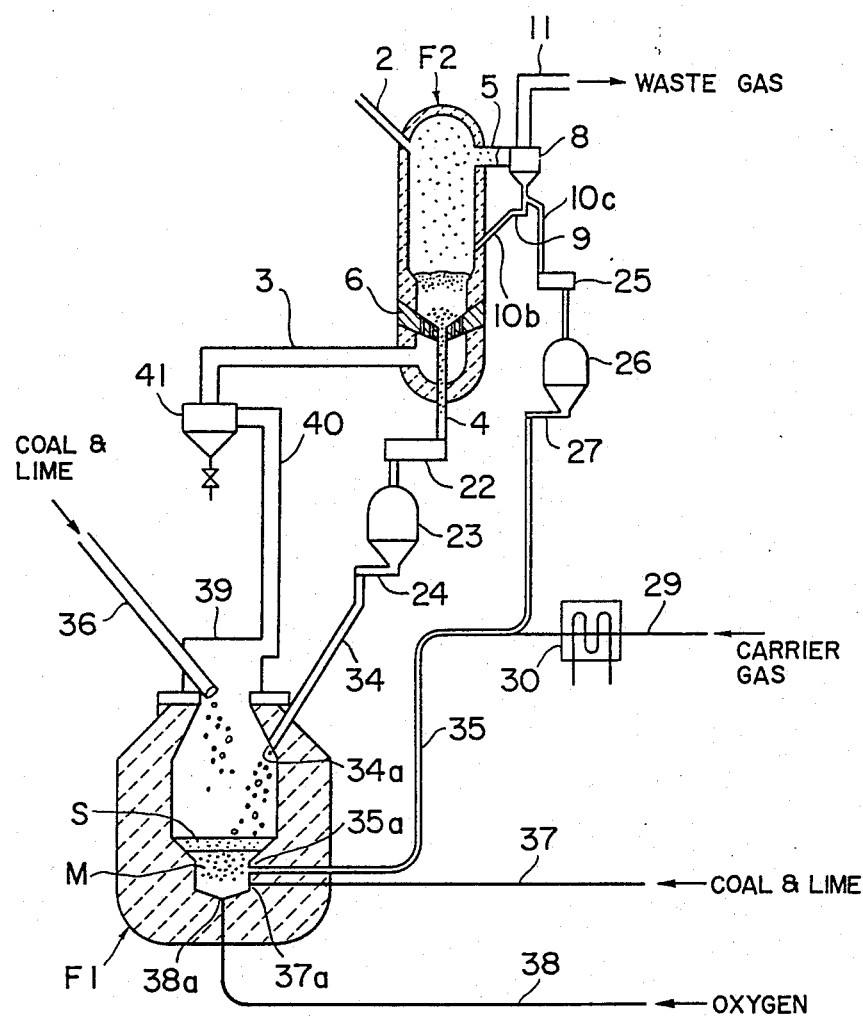
FIG. 1 is a diagrammatic illustration of the metal-making apparatus constructed in accordance with the novel concepts of the invention, the apparatus being herein shown adapted for the production of iron from iron ore.

The apparatus of the invention is shown in FIG. 1 as adapted for the production of iron by reductive treatments of fines and larger size iron ore. Broadly, the exemplified apparatus comprises a tandem configuration of a smelting reduction furnace F1 (hereinafter referred to as the smelting reduction furnace) and a solid-state prereduction furnace F2 (hereinafter referred to as the prereduction furnace). The smelting reduction furnace F1 reduces the prereduced iron ore particles in the molten state, with the consequent production of high temperature reductive gas. The prereduction furnace F2 utilizes this gas for preliminarily reducing the raw iron ore particles in a solid state.

The smelting reduction furnace F1 is of the molten iron bath type capable of holding the molten iron M and slag S in the molten state within a refractory-lined vessel. Reduction takes place within the smelting reduction furnace F1 as the prereduced ore particles, coal, lime, and oxygen are fed into the furnace, as will be detailed subsequently.

Figure 2:
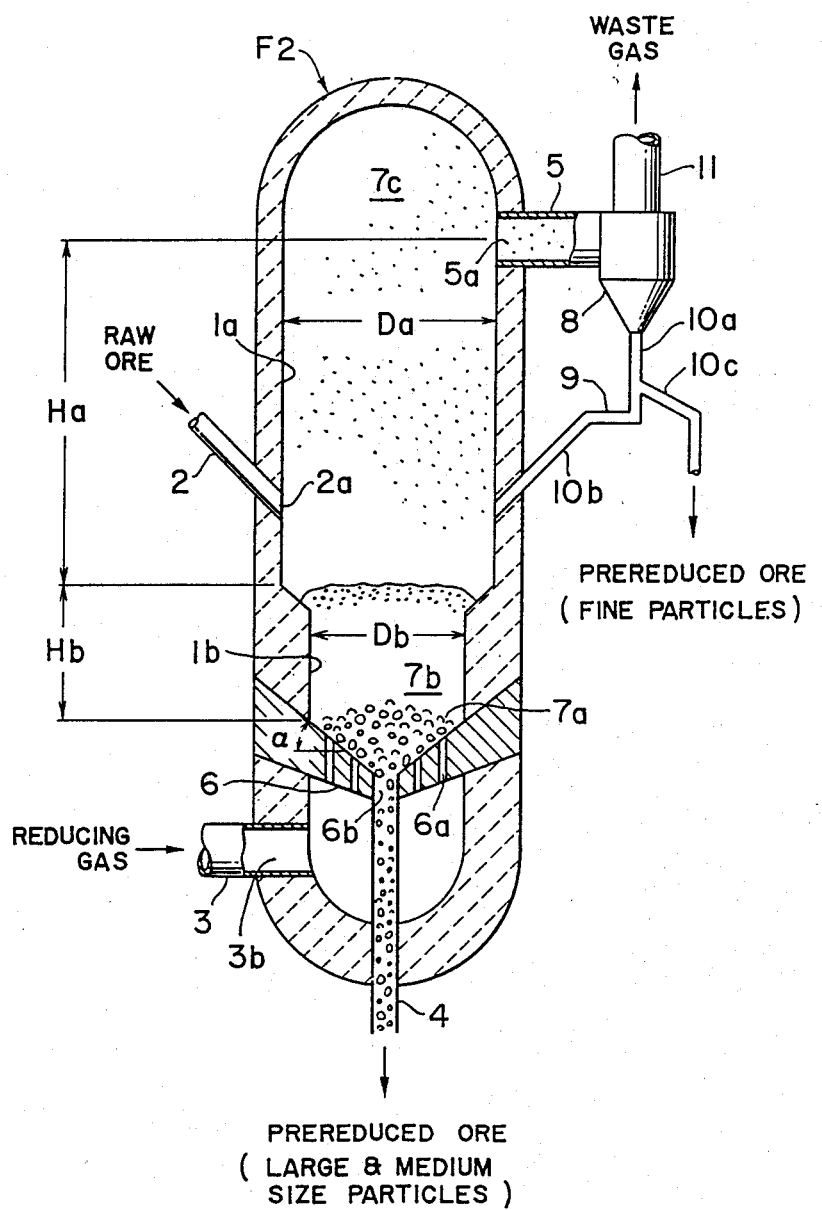
FIG. 2 is an enlarged vertical section of the prereduction furnace used in the apparatus of FIG. 1.

As illustrated on an enlarged scale in FIG. 2, the prereduction furnace F2 comprises a vessel, complete with a refractory lining, that is in the form of an upstanding cylinder. An ore supply conduit or chute 2 is coupled to the midportion of the prereduction furnace F2 for charging raw iron ore particles of a wide range of sizes therein through an inlet port 2a. A reducing gas supply conduit 3 is coupled to the bottom end portion of the furnace for introducing reducing gas at a high temperature through its inlet port 3b. A reference back to FIG. 1 will reveal that this reducing gas is supplied from the smelting reduction furnace F1. A prereduced ore discharge chute 4 extends downwardly from the furnace for the delivery of the prereduced ore particles of relatively large size toward the smelting reduction furnace F1. Further a waste gas exhaust conduit 5 is coupled to the top end portion of the furnace vessel for the withdrawal of the waste reductive gas from within the furnace through an exhaust port 5a.

Within the prereduction furnace F2 an openwork bottom or grate type gas distributor 6 (hereinafter referenced to as the distributor) is disposed in a position above the reducing gas inlet port 3b and below the raw ore inlet port 2a. The distributor 6 has a multiplicity of perforations or like openings 6a to permit the reducing gas to flow up therethrough and, hence, to create diffused gas streams necessary for the prereduction of the charged ore particles. The distributor 6, or at least its top surface, is funnel-shaped, with the top surface having an angle α with respect to the plane of the horizon. This angle α is greater than the angle of repose of the ore particles to be charged into the furnace. Positioned centrally of the distributor 6, an ore discharge port 6b communicates with the discharge chute 4 for the discharge of prereduced coarse and medium-size one particles.

A solid-gas separator such as, typically, a cyclone separator 8 is coupled to the waste gas exhaust conduit 5 for collecting and recovering the fine ore particles contained in the waste gas from the prereduction furnace F2. Freed of such ore particles, the waste gas is directed into an exhaust duct 11. The recovered fine ore particles, on the other hand, fall into a chute 10a depending from the cyclone separator 8 and communicating with both a recirculation chute 10b and a discharge chute 10c. (See FIG. 2) The recirculating ore flow rate and discharging ore flow rate are controlled by the control valve 9 and 25, respectively. The recirculation chute 10b is open to the interior of the prereduction furnace F2 at a point which is approximately at the same level as the inlet port 2a for the raw ore particles. Therefore, recovered from the waste gas by the cyclone separator 8, the fine ore particles are at least in part recharged into the prereduction furnace F2 for recirculation.

The discharge chute 10c communicates with the smelting reduction furnace F1, as will be later described in more detail with reference to FIG. 1. The fine ore particles recovered from the waste gas may therefore be withdrawn from their recirculation path and fed toward the smelting reduction furnace F1 by the discharging ore flow rate control valve 25 in communication with the discharge chute 10c. Preferably, the recirculating ore flow rate control valve 9 should be of the type capable of preventing reverse gas flow from prereduction furnace F2 to cyclone separator 8.

The interior of the prereduction furnace F2 has a reduced diameter portion 1b located above the distributor 6. This reduced diameter portion serves to premit the reducing gas to flow therethrough at a sufficient rate to "fluidize" the ore particles of widely varying sizes on the distributor 6. A greater diameter portion 1a, overlying the reduced diameter portion 1b, is effective to retard the gas speed and hence to set a limit on the size of the finer particles that are carried away by the waste gas from the prereduction furnace F2.

Such being the construction of the prereduction furnace F2, the iron ore particles distributed in a wide range of sizes may be charged onto the distributor 6 through the ore inlet port 2a. The high temperature reducing gas may also be directed from the smelting reduction furnace F1 into the prereduction furnace F2 through the supply conduit 3. Flowing upwardly through the perforations 6a in the distributor 6, the gas will reduce the overlying charge of ore particles. After having been thus prereduced, the large- and medium-size particles will be discharged though the discharge chute 4 whereas the fine particles will be carried away by the waste gas into the exhaust conduit 5.

More specifically, during the progress of ore reduction within the prereduction furnace F2, the medium-size particles will form a "fluidized bed" 7b at the reduced diameter portion 1b over the distributor 6 and/or the greater diameter size portion 1a, with the diffuse streams of reducing gas bubbling up therethrough at high speed. However, those ore particles which are too coarse to be fluidized will form, instead, a mobile layer 7a, slowly traveling over the sloping top surface of the distributor 6 toward the central discharge port 6b. Such largesize particles will be prereduced while so traveling over the distributor.

It is assumed that the raw ore particles charged into the prereduction furnace F2 include those too small to stay in the fluidized bed over the distributor 6. Such smaller size particles will be blown up by the reducing gas in the larger diameter portion 1a and thence into the exhaust conduit 5. Then, separated from the waste gas by the cyclone separator 8, the fine particles will be carried back into the prereduction furnace F2 via the recirculation chute 10b, thereby forming a recirculating flow of such particles designated 7c. The fine particles will also be reduced while being so recirculated, and will be discharged through the discharge chute 10c as a discharging ore flow rate control valve is placed in the chute 10c.

Notwithstanding the embodiment showing in FIG. 2 it is not essential that both coarse and medium-size particles be discharged through the common discharge chute 4. Alternatively, the medium-size particles may be discharged through an additional chute or conduit in direct communication with the reduced diameter portion 7b of the prereduction furnace F2. Also, the interior of the prereduction furnace F2 may taper toward the distributor 6, instead of being formed into the portions 1a and 1b of distinctly different diameters. As a further possible modification the prereduction furnace F2 may be provided with a inclined plane grate set at an angle to the plane of the horizon, in substitution for the funnel-shaped grate 6.

Advantageously, the invention permits the independent control of the residence time of coarse and medium-size ore particles within the prereduction furnace F2, and of the residence time of fine ore particles within the recirculation path. The rate of discharge of coarse and medium-size particles is determined by a discharge control valve 22, as in FIG. 1, on the discharge chute 4, and the rate of discharge of fine particles is determined by the circulating ore flow rate control valve 9 on their recirculation path. Being dependent upon the rates of discharge, the residence times may be independently controlled by the valves 9 and 22.

The following is a report of an experiment conducted by the instant applicant on the solid-state prereduction of iron ore with the furnace F2 of FIG. 2. The conditions of the experiment were:

1. Raw Material
Iron ore
Particle size distribution:
  More than 10 mm . . . 2%.
  5-10 mm . . . 18%.
  0.5-5 mm . . . 31%.
  Less than 0.5 mm . . . 49%.
Charging temperature: 450 degrees C.
2. Reducing Gas
Composition:
  Carbon monoxide (CO) . . . 39%.
  Carbon dioxide ($CO_2$) . . . 21%.
  Hydrogen ($H_2$) . . . 14%.
  Steam ($H_2O$) . . . 12%.
  Nitrogen ($N_2$) . . . 14%.
Temperature: 1030 degrees C.
3. Dimensions of Prereduction Furnace
Diameter Da of furnace portion 1a=280 mm.
Diameter Db of furnace portion 1b=200 mm.
Height Ha of exhaust conduit 5 from bottom of furnace portion 1a=4000 mm.
Vertical dimension Hb of furnace portion 1b=500 mm.
Grate angle α=40 degrees.

As a result of the experiment under the above specified conditions, prereduced iron ore particles were recovered from both discharge chutes 4 and 10c, and generally with a reduction rate of approximately 30%. Of the recovered material, 49% was from the chute 4, and 51% from the chute 10c. The material recovered from the chute 4 contained 97% of coarse and medium-size particles (particle size not more than 0.5 mm). The material recovered from the other chute 10c contained 97% of fine particles (particle size less than 0.5 mm).

The foregoing results of the experiment are believed to justify the following mathematical analyses of gas and ore behaviors within the prereduction furnace. The flow rate of the reducing gas just above the distributor 6, that is, at the reduced diameter furnace portion 1b, was 7.0 meters per second, which is enough to "fluidize" only ore particles of five millimeters or less in size. The gas flow rate at the larger diameter furnace portion 1a was 5.0 meters per second, which is enough to enable the gas to carry ore particles of 0.5 millimeter or less away from the furnace.

Consequently, out of the iron ore particles of varying sizes that had been charged into the prereduction furnace F2, those exceeding five millimeters in size formed a mobile layer 7a on the distributor 6; those between 0.5 and five millimeters formed a "bubbling" quasi-fluid layer or mobile layer 7b at the reduced diameter furnace portion 1b; and those of less than 0.5 millimeter in size recirculated through the closed path.

It has also been confirmed from the experiment that: (1) the particle sizes of the prereduced ore discharged from the two separate chutes 4 and 10c depend on the rate of introduction of the reducing gas into the furnace; and (2) the rates of reduction of the two different grades of ore particles depend upon their residence times within the furnace.

The advantages gained by the prereduction furnace F2 of the foregoing construction and operation may be summarized as follows:

1. Raw ore particles in a wide range of sizes can be directly charged into the prereduction furnace without any such pretreatments as comminution, pelletizing, or sizing.

2. Prereduced ore particles of small size and medium and large sizes can be separately recovered from the prereduction furnace, for separate delivery to the smelting reduction furnace F1.

3. The residence times of the two different classes of ore particles can be separately determined, making possible the easy and accurate control of their expected reduction rates.

4. The coarse ore particles directly overlying the distributor serve to prevent the finer particles from falling down through the distributor when the introduction of the reducing gas into the furnace is terminated. The perforations or openings of the distributor can therefore be made sufficiently large to avoid clogging.

5. The maximum size of particles to be "fluidized" and the maximum size of particles to be recirculated can be predetermined at desired values by varying the relative cross sectional areas of the top and bottom portions 1a and 1b of the prereduction furnace, so that a higher rate of reduction can be realized than heretofore.

Referring back to FIG. 1, it will be seen that the discharge chute 4 of the prereduction furnace F2 communicates with a storage vessel 23 via the discharge control valve 22. The other discharge chute 10c of the prereduction furnace F2 communicates with another storage vessel 26 via another discharge, control valve 25. Therefore, once recovered from the prereduction furnace F2, the coarse and medium-size ore particles will be temporarily stored in the storage vessel 23, and the fine ore particles in the other storage vessel 26, prior to separate delivery to the smelting reduction furnace F1.

Both storage vessels 23 and 26 have built-in weighing instrument, not shown, for measuring the amounts of the incoming prereduced ore particles. Accordingly, as a charge control valve 24 is opened, the coarse and medium-size particles will be charged onto the slag S of the molten iron bath within the smelting reduction furnace F1 by falling by the force of gravity through a supply chute 34 which is open to an inlet port 34a above the level of the bath. Likewise, as another charge control valve 27 is opened, the fine ore particles will be carried through a supply conduit 35 by a carrier gas and blown directly into the molten iron M or the slag S within the smelting reduction furnace F1 through an injection nozzle 35a submerged in the bath.

The carrier gas, which may be either an inert gas such as nitrogen $N_2$ for a reductive gas such as carbon monoxide CO, is supplied from its source, not shown, through a conduit 29 in constant communication with the ore supply conduit 35. A heater 30 is provided downstream of the unshown gas supply for preheating the carrier gas in this particular embodiment. The first recited charge control valve 24 should be of the type capable of maintaining the pressure differential between the storage vessel 23 and the supply chute 34.

For the desired smelting reduction of the prereduced iron ore, the smelting reduction furnace F1 is supplied with oxygen, coal, and lime, in addition to the prereduced ore particles. Oxygen $O_2$ is blasted directly into the molten iron M through a supply conduit 38. As an alternative, the oxygen gas can be introduced into the smelting reduction furnace through a lance inserted from the upper opening of the furnace. Preferably, and as shown, relatively coarse particles and relatively fine particles of coal and lime should be fed separately into the smelting reduction furnace F1, just like the two different classes of prereduced ore particles from the prereduction furnace F2. The coarse coal and lime particles may be fed by gravity through a supply chute 36 onto the iron bath. The fine coal and lime particles may be conveyed by a carrier gas, such as that used for carrying the prereduced fine ore particles, through a supply conduit 37 and blown directly into the molten iron M.

As has been mentioned with reference to FIG. 2, the reductive high-temperature gas generated within the smelting reduction furnace F1 is delivered to the prereduction furnace F2 for prereducing the raw ore particles therein. Toward this end the smelting reduction furnace F1 has its open top covered by a hood 39 which is in constant communication with a duct 40. The reducing gas supply conduit 3 communicates with the duct 40 via a solid-gas separator such as a cyclone separator 41. Thus, freed from solids such as dust and iron particles by the cyclone separator 41, the reducing gas will be delivered at a high temperature from smelting reduction furnace F1 to the prereduction furnace F2.

The advantageous effects obtained in connection with the smelting reduction furnace F1 may be enumerated as follows:

1. The prereduced ore particles of large and medium size can be chuted by the force of gravity into the smelting reduction furnace F1 with little or no likelihood of being blasted away from within the furnace by the gas generated by the molten iron M.

2. The prereduced ore particles of smaller size are injected directly into the molten metal M by being pneumatically conveyed through the supply conduit 35 and injection nozzle 35a. If these ore particles are less than one millimeter in size, for example, then the supply conduit 35 and injection nozzle 35a can be as small in inside diameter as from 10 to 13 millimeters. The carrier gas can be supplied at a relatively low rate for conveying such fine particles through such small diameter conduit and nozzle without the risk of clogging. Additionally, wear of the supply conduit and injection nozzle is reduced to a minimum, and there is practically no possibility of the carrier gas blowing through the molten iron M.

3. The prereduced ore particles at an elevated temperature (approximately 800 degrees C. within the prereduction furnace F2) are fed directly from prereduction furnace to smelting reduction furnace F1 without any such intermediate treatment as sizing, comminution or pelletizing. If the storage vessels 23 and 26, etc., are suitably insulated against heat, the sensible heat of the prereduced ore can be fully utilized for its molten-state reduction in the smelting reduction furnace F1.

4. Since the carrier gas can be supplied at a relatively low rate for conveying the prereduced ore particles of smaller size into the smelting reduction furnace F1, as has been pointed out, the smelting reduction furnace would suffer little temperature drop even if, contrary to the showing of FIG. 1, the carrier gas were not preheated.

5. When the delivery of the prereduced fine ore particles from the storage vessel 26 is suspended, the supply of the carrier gas into the conduit 35 must be continued in order to prevent the inflow of the molten iron M into the injection nozzle 35a. However, by preheating the carrier gas to a temperature range of, say, 700-800 degrees C. by the heater 30, the temperature difference between the prereduced ore and the gas can be reduced to such an extent as to preclude the danger of thermal stress cracking of the supply conduit 35, even if the conduit is lined with a ceramic material to resist wear.

6. Being not exposed to oxidizing gas, the prereduced ore will not be reoxidized during transfer from prereduction furnace F2 to smelting reduction furnace F1. The two separate grades of prereduced ore particles may be charged into the smelting reduction furnace F1 at the rates determined by the weighing instrument built into the storage vessels 23 and 26 and by the charge control valves 24 and 27.

Figure 3:
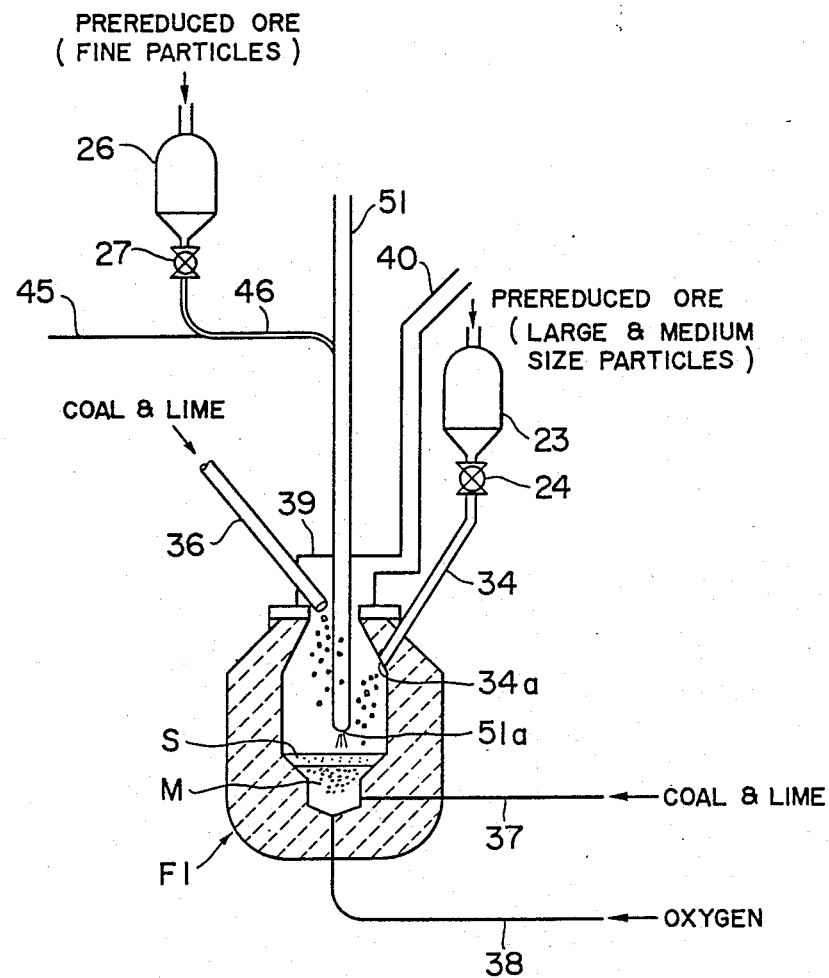
FIG. 3 is a partial diagrammatic illustration of another preferred embodiment of the invention, featuring alternative means for charging prereduced ore particles of smaller size into the smelting reduction furnace.

FIG. 3 shows an alternative embodiment of the invention, featuring a different method of charging the prereduced ore particles of smaller size into the smelting reduction furnace F1. The storage vessel 26 for the finer ore particles communicates with an injection lance 51 via the charge control valve 27, herein shown as a rotary feeder, and a supply conduit 46. The prereduced fine ore particles are fed through the supply conduit 46 and injection lance 51 by a carrier gas fed through a conduit 45. The injection lance 51 extends downwardly into the smelting reduction furnace F1 through its open top and terminates short of the level of the iron bath. The fine ore particles are to be charged into the smelting reduction furnace F1 from the tip of the injection lance 51 held out of contact with the iron bath.

The FIG. 3 embodiment is akin in the other constructional details to that of FIGS. 1 and 2.

A pronounced advantage of the FIG. 3 apparatus is that neither the molten iron M nor slag S is to flow into the injection lance 51 when the introduction of the prereduced fine ore particles is suspended. Unlike the preceding embodiment, therefore, the carrier gas need not be blasted through the injection lance during the nonintroduction of the fine ore particles, so that the bath in the smelting reduction furnace will suffer no temperature drop even if the carrier gas is not preheated. The supply conduit 46 and injection lance 51 are immune to thermal stress cracking as they are not cooled by the carrier gas during the nonintroduction of the fine ore particles.

The use of the injection lance 51 offers an additional advantage of being also used for such purposes, in addition to the injection of the prereduced fine ore particles, as temperature measurement and sampling of the molten iron M, the charging of coal and lime in finely divided form, and the blasting of oxygen into the smelting reduction furnace F1.

Despite the foregoing detailed disclosure, it is not desired that the invention be limited by the exact showings of the drawings or the description thereof. A variety of modifications or alterations of the illustrated embodiments may be resorted to in order to conform to the requirements of each specific metal-making operation or to design preferences, without departure from the scope of the invention encompassed by the claims below.

What is claimed is:

1. A metal-making apparatus using a raw ore which contains a metallic oxide and which has a wide range of particle sizes, the metal-making apparatus comprising:
   (a) a solid-state prereduction furnace for preliminarily reducing a raw ore in a solid state, said prereduction furnace having a distributor with a funnel-shaped or inclined top surface;
   (b) raw ore supply means for charging raw ore particles of widely varying sizes into said prereduction furnace for placement on said distributor;
   (c) gas supply means for blowing high temperature reducing gas up through said distributor and a charge of raw ore particles thereon for causing ore particles of a larger size to form a fluidized bed on said distributor and for prereducing ore particles of a larger size by intimate contact with a high temperature reducing gas, and for causing ore particles of smaller size to be carried out from the fluidized bed by the waste gas for being prereduced thereby;
   (d) separator means for collecting the prereduced ore particles of smaller size from the waste gas;
   (e) a smelting reduction furnace for smelting and finally reducing a prereduced ore in a molten state;
   (f) first delivery means for delivering the prereduced ore particles of larger size from said prereduction furnace to said smelting reduction furnace, said first delivery means including means for charging the prereduced ore particles of larger size into said smelting reduction furnace by the force of gravity; and
   (g) second delivery means for delivering the prereduced ore particles of smaller size from said separator means to said smelting reduction furnace, said second delivery means including means for pneumatically injecting the ore particles of smaller sizer into said smelting reduction furnace.

2. The metal-making apparatus of claim 1, wherein the angle of said inclined top surface of said distributor with respect to the plane of the horizon is greater than the angle or repose of the ore particles to be loaded thereon.

3. The metal-making apparatus of claim 2, wherein said distributor has a discharge opening defined centrally therein for discharging the prereduced ore particles of larger size, the discharged larger size ore particles being delivered to said smelting reduction furnace via said first delivery means.

4. The metal-making apparatus of claim 1, wherein said separator means includes:
   (a) exhaust means for exhausting the waste gas, laden with the ore particles of smaller size, from said prereduction furnace;
   (b) a separator coupled to said exhaust means for recovering the smaller size ore particles from the exhaust gas;
   (c) a recirculation conduit for returning at least part of the recovered smaller size ore particles back into said prereduction furnace for recirculation;
   (d) a discharge conduit for delivering at least part of the recovered smaller size ore particles to said smelting reduction furnace via said second delivery means; and
   (e) a recirculating ore flow rate control valve in said recirculation conduit and with said discharge conduit.

5. The metal-making apparatus of claim 1, wherein said prereduction furnace is substantially in the shape of an upstanding cylinder and has a first portion of reduced inside diameter immediately over said distributor, and a second portion of greater inside diameter over said first portion thereof.

6. The metal-making apparatus of claim 1, wherein the pneumatic injecting means of said second delivery means includes an injection nozzle opening into said smelting reduction furnace.

7. The metal-making apparatus of claim 1, wherein the pneumatic injecting means of said second delivery means include an injection lance extending into said smelting reduction furnace.

8. The metal-making apparatus of claim 1, wherein said second delivery means further includes a heater for preheating a carrier gas used for carrying and injecting the smaller size ore particles into said smelting reduction furnace.

* * * * *